3,647,766
METHOD OF MAKING HYDROXYL-TERMINATED POLYSULFIDE POLYMERS
Eugene R. Bertozzi, Yardley, Pa., assignor to Thiokol Chemical Corporation, Bristol, Pa.
No Drawing. Filed Apr. 23, 1970, Ser. No. 31,367
Int. Cl. C08g 11/00, 17/14, 22/14
U.S. Cl. 260—79
25 Claims

ABSTRACT OF THE DISCLOSURE

Method of making liquid hydroxyl-terminated polysulfide polymers having a random distribution of diverse oxahydrocarbon groups between the polysulfide groups thereof. The hydroxyl-terminated polysulfide polymers are prepared by mixing (1) a liquid polysulfide polymer having mercapto or hydroxyl terminals and having a linear backbone consisting essentially of spaced polysulfide groups and repeating identical oxahydrocarbon groups of the structure —ROCH$_2$OR—, wherein R is lower alkylene, between the polysulfide groups thereof, (2) a hydroxyl-terminated polymer selected from linear polyesters, polyformals of polyalkylene glycols, polyformals, of linear polyesters and mixtures thereof, and (3) a catalytic amount of a strong non-oxidizing mineral acid. The initially incompatible mixture is maintained at a moderately elevated temperature with agitation to cause an interchange reaction to occur which produces a compatible mixture of hydroxyl-terminated polysulfide polymers characterized by the fact that there is a random distribution of diverse oxahydrocarbon groups between the polysulfide groups of the product polymers. In most cases the interchange reaction can be caused to proceed at temperatures within the range 20° C. to 70° C. The product polymers are adapted to be reacted with polyisocyanates to form isocyanate-terminated prepolymers that can be cured by conventional curing agents to form castings, sealants, coatings and the like.

---

This invention relates to a method of making hydroxyl-terminated polysulfide polymers, and more particularly, to a method which permits the production of more diverse types of hydroxyl-terminated polysulfide polymers than have heretofore been made.

It is known that hydroxyl-terminated polysulfide polymers react readily with diisocyanates to form isocyanate-terminated polymers than can be cured in a variety of ways to form useful products. For example, in Santaniello U.S. Pat. 3,386,963, isocyanate-terminated polymers are disclosed which are prepared from hydroxyl-terminated polysulfide polymers and which are storage-stable and are curable at room temperature with various curing agents and, in some cases, even upon exposure to atmospheric moisture. Since the cured polymers tend to adhere to glass, wood, metal and concrete, they can be used as sealants and adhesives. Certain of the polymers form tough elastomers and are suitable as protective coatings and structural masses. Because of the presence of the polysulfide groups therein, they have exceptionally good solvent resistance.

The hydroxyl-terminated polysulfide polymers used in preparing such products have been prepared in a number of ways. Thus as disclosed in U.S. Pat. 3,386,963, they may be prepared by reacting organic dichlorides of the formula Cl—R—Cl, wherein R is an aliphatic hydrocarbon or oxahydrocarbon group, with aqueous inorganic alkaline polysulfides in the presence of sufficient chlorhydrin to form the hydroxyl-terminated polysulfide.

Alternatively hydroxyl-terminated polysulfides may be prepared by a two-step process as disclosed in Fettes et al. Pat. 2,606,173. In accordance with this process mercapto-terminated polysulfide polymers are first prepared by reaction of an organic dichloride with aqueous alkaline inorganic polysulfide and the resulting polythiopolymercaptan polymer is then reacted with a hydroxyl-containing monomer such as mercaptoethanol to provide a polymer with the desired hydroxyl terminals.

Other processes which have been proposed for producing hydroxyl-terminated polysulfide polymers involve the acid hydrolysis of preformed polythiopolymercaptans and the condensation of dithiodiglycols with non-sulfur-containing glycols.

Each of these previously proposed processes is subject to one or more limitations that render them impractical for use in the preparation of hydroxyl-terminated polysulfide polymers wherein the hydrocarbon or oxahydrocarbon groups interconnecting the disulfide groups are of a heterogeneous and diverse character and wherein there is a relatively wide spacing of the disulfide groups in the polymer backbone. Considering first those processes wherein the polysulfide component of the polymer has been made by reaction of an organic halide, e.g.,

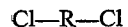

Cl—R—Cl with an inorganic aqueous alkaline polysulfide, as a practical matter the useful R groups are limited to relatively simple alkylene, ether or formal groups for several reasons. In the first place, it is difficult and expensive to make dihalides having a more complex structure. In the second place, this polymerization process requires the solubilization of an unpolymerizable by-product terminal in the aqueous polysulfide reagent. If the dichloro compound has a molecular weight higher than about 225, the resulting unpolymerizable terminal cannot be solubilized in the excess polysulfide and thus a polymer with a high molecular weight cannot be made. Also if the R group of the dihalide contains an ester or cyano group, the high alkalinity of the inorganic polysulfide solution causes almost immediate hydrolysis of such groups, thus decomposing the dihalide monomer and making it impossible to obtain a polymer. In general, the commercially available polysulfide polymers made by this type of process are characterized by the fact that they are largely composed of recurring —SRS— groups wherein the R groups interconnecting the disulfide groups in the polymer chain are the same and are relatively short chain alkylene groups or monoether or monoformal groups.

The process based on the use of dithiodiglycols as starting materials are subject to the disadvantage that they employ elevated temperatures at which the dithiodiglycols tend to be unstable. In these processes undesired decomposition of the dithiodiglycols and side reactions occur producing by-products having an objectionable odor and undesired crosslinking occurs.

It is an object of the present invention to provide a process for making hydroxyl-terminated polysulfide polymers that are not subject to the limitations of the prior processes outlined above. It is another object of the invention to provide a process for making hydroxyl-terminated polysulfide polymers which, like the hydroxyl-terminated polymers disclosed in U.S. Pat. 3,386,963, can be reacted with diisocyanates to form stable prepolymers and cured to form useful sealants, coatings, castings and the like, but which are characterized by the fact that they have a random distribution of diverse oxahydrocarbon groups between the polysulfide groups thereof, and may have a substantially wider spacing between the polysulfide groups of the polymer backbone. Other objects of the invention will be in part obvious and in part pointed out hereafter.

The objects of the invention may be achieved, in general, by causing an interchange reaction to take place between certain readily available liquid polysulfide polymers on the one hand and certain hydroxyl-terminated, sulfur-free, oxahydrocarbon polymers on the other hand. The liquid polysulfide polymers used in the present process may have either mercapto or hydroxyl terminals and have a linear backbone consisting essentially of spaced polysulfide groups which are interconnected by identical oxahydrocarbon groups of the structure —ROCH$_2$OR— wherein R is an alkylene group. The alkylene groups preferably contain 2 to 4 carbon atoms.

The sulfur-free, oxahydrocarbon polymers used in the present process are selected from hydroxyl-terminated linear polyesters, polyformals of linear polyesters, polyformals of polyalkylene glycols and mixtures thereof. The sulfur-free polymers are preferably liquid polymers, but may also be low melting point solids. In carrying out the process the polysulfide polymer is mixed with the sulfur-free polymer and a small amount of a strong non-oxidizing mineral acid. The components of the mixture as originally prepared are incompatible as evidenced by the turbidity of the mixture. However, it has been found that by maintaining the mixture at moderately elevated temperature the turbidity disappears and an interchange reaction occurs such that a hydroxyl-terminated polymer is obtained in which the disulfide groups are interconnected by a random distribution of diverse units derived from the oxahydrocarbon groups of the polysulfide polymer and from the oxahydrocarbon groups of the polyester, polyformal of the polyalkylene glycol or polyformal of the polyester. Since a wide variety of the polyesters and polyformals can be readily prepared, the present process permits the preparation of hydroxyl-terminated polysulfide polymers having widely different backbone structures which in turn modify the properties of coatings, castings and sealants prepared therefrom to suit the requirements of a wide range of applications.

The mercapto-terminated polysulfide polymers useful in the present process are known per se in the art and may be prepared as disclosed, for example, in U.S. Pat. 2,466,936. Several of the commercially available mercapto-terminated polymers are particularly described in articles by Fettes and Jorczak, published in "Industrial and Engineering Chemistry," vol. 42, page 2217 (1950) and vol. 43, page 324 (1951). As pointed out in these articles, these liquid polymers, e.g., the LP-2 polymer described therein, are generally prepared from bis-beta-chloroethylformal and are essentially composed of recurring (S·CH$_2$·CH$_2$·O·CH$_2$·O·CH$_2$CH$_2$·S) groups and have free mercapto terminals through which they may be cured to form a solid elastomer. In the manufacture of these commercial polymers a small percentage of trichloropropane is commonly mixed with the formal to provide a certain amount, say 0.1 to 4%, of cross-linking. Their molecular weights may vary from 500 to 10,000 and their viscosities from 300 to 100,000 centipoises at 25° C. The hydroxyl-terminated polysulfide polymers used as starting materials in the present process may be prepared from the mercapto-terminated polymers by an inversion reaction illustrated in the specific examples given below.

The sulfur-free, hydroxyl-terminated linear polyesters used in the present process are also known per se in the art. They may be made in known manner by condensing, for example, glycols such as ethylene, propylene, butylene, diethylene, triethylene, dipropylene or tripropylene glycol or mixtures of such glycols with dicarboxylic acids such as, for example, adipic, succinic, sebacic, fumaric or maleic acids or their anhydrides. The polyesters preferably have molecular weights within the range 500 to 10,000.

Polyformals of polyalkylene ethers and linear polyesters are also known per se in the art and, in general, any of these known polymers which are liquid or low melting point solids may be used in the present process.

The preferred polyalkylene ether formals may be represented by the general formula:

wherein R$_1$ is hydrogen, methyl or ethyl, m is 1 to 6 and n is 2 to 10. Representative polyformals are those of diethylene glycol, triethylene glycol, tetraethylene glycol and dipropylene glycol.

The preferred polyester polyformals are formals of polyesters which are linear condensation products of glycols and aliphatic dicarboxylic acids such as the linear polyesters mentioned above and may be represented by the general formula:

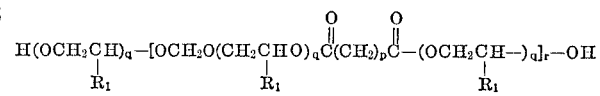

wherein p is 2 to 8, q is 1 to 4, r is 2 to 10, and R$_1$ is hydrogen, methyl or ethyl. The polyformals may be prepared by reacting the polyalkylene glycol or polyester with formaldehyde or a compound producing formaldehyde such as paraformaldehyde or trioxane under known conditions.

The acids used to catalyze the interchange reaction are strong non-oxidizing acids, e.g., sulfuric, hydrochloric and/or phosphoric acids. They are used in catalytic amount which may range from 0.01 to 2 percent by weight, based on the total weight of reactants.

The proportions of the polysulfide polymer and the sulfur-free polymer used may be conveniently expressed in terms of molar segment weights of the recurring units of the reactants. For example, as indicated above the recurring unit of the LP-2 polysulfide polymer is (SCH$_2$CH$_2$OCH$_2$OCH$_2$CH$_2$S)

and thus its mol segment weight is 166. If one mol segment weight of the LP-2 polymer is reacted with one mol segment of a polyformal of tetraethylene glycol, a mixture of polymers is obtained having the recurring units of an average structure:

—[SSCH$_2$CH$_2$OCH$_2$O(CH$_2$CH$_2$O)$_3$
CH$_2$CH$_2$OCH$_2$OCH$_2$CH$_2$]—

It should be noted that the nature of the interchange reaction that occurs is such that interchanges occur at different formal groups of the two reactants. Thus a polymer mixture is obtained in which the polymer chains contain a random distribution of diverse oxahydrocarbon groups between the polysulfide groups thereof. The foregoing formula is intended to indicate merely the average structure of the recurring units of the backbones of the polymers of the product mixture.

In like manner, if one mol segment weight of the LP-2 polymer is reacted with one mol segment weight of a polyformal of a polyester made from ethylene glycol and adipic acid, a polymer is obtained having recurring units of an average structure:

Similarly if one mol segment weight of LP-2 polymer is reacted with one mol segment weight of a linear polyester of ethylene glycol and adipic acid, a polymer is obtained having recurring units of the average structure:

The relative amounts of polysulfide polymer and sulfur-free polymer used are not critical and may vary over a wide range. Thus the mol segment weight of the polysulfide may vary from say 5% to 95% of the sum of the mol segment weights of the polysulfide and the non-sulfur containing reactant or reactants.

It is evident that when different mol segment weights of the reactants are used, recurring units of the product polymers containing a single SS group will vary in composition and length, that is to say, the oxahydrocarbon chains between successive SS groups will further vary and will have a random pattern in the polymer backbone. Moreover, by using a relatively small proportion of the polymercaptan, polymers can be obtained having a relatively wide average spacing of SS groups in the polymer backbone. By using mixtures of the sulfur-free reactants, polymers having especially wide diversity of intervening oxahydrocarbon groups can be obtained.

In order to minimize possible undesired thermal decomposition of the polysulfide polymer, the interchange reaction is desirably carried out at a relatively low temperature. It has been found that in most cases the desired interchange can be effected at temperatures within the range 20° to 70° C. However, in particular cases temperatures as high as 80° to 90° C. may be required.

As indicated above, the hydroxyl-terminated polysulfide polymers produced by the present process can be reacted in known manner with polyisocyanates to form stable liquid prepolymers with isocyanate terminals through which they can be cured by a variety of curing agents. Polyisocyanates that can be used for this purpose include arylene polyisocyanates such as tolylene, metaphenylene, 4 - chlorophenylene - 1,3-, methylene-bis-(phenylene - 4-), biphenylene-4,4'-, 3,3'-dimethoxy-biphenylene-4,4'-, 3,3'-diphenyl-biphenylene-4,4'-, naphthalene-1,5- and tetrahydronaphthalene-1,5-diisocyanates and triphenylmethane triisocyanate; alkylene polyisocyanates such as ethylene, ethylidene, propylene-1,2-, butylene-1,4-, butylene-1,3-, hexylene-1,6-, decamethylene-1,10, cyclohexylene-1,2-, cyclohexylene-1,4- and methylene-bis-(cyclohexyl - 4,4'-)-diisocyanates. Toluene diisocyanates, commercially the most widely used diisocyanates, are preferred, especially a mixture of 80% of the 2,4-isomer and 20% of the 2,6-isomer thereof. Inorganic polyisocyanates are also suitable according to the invention.

Curing of the isocyanate-terminated prepolymer can be effected with known curing agents such as polyhydric alcohols, polyamines, e.g., methyl bis-orthochloroaniline, hydrous metal halides and diliquescent salts. Certain of the prepolymers in thin film form give an acceptable cure with atmospheric moisture alone. Typical applications of the cured materials have been indicated above.

In order to point out more fully the nature of the present invention, the following examples are given of illustrative methods of carrying out the process of the invention.

EXAMPLE 1

A polyformal of diethylene glycol was made by charging a reaction flask with 2 mols (212 grams) of diethylene glycol, 2.20 mols (66 grams) 95% p-formaldehyde powder, 1 cc. of concentrated sulfuric acid and 100 cc. of reagent benzene. The reaction mixture was heated with agitation to reflux temperature and refluxed until 2.20 mols (39 cc.) of water had been removed. Then the charge was cooled down to room temperature.

Thereafter 332 grams (2 polymer segment weights) of an LP-2 polymercapto-polysulfide polymer was added to the pot. This mixture was initially an opaque white mixture. It was slowly heated under nitrogen and at about 55° C. became clear, thus indicating that the desired interchange reaction had occurred. At this point heating was discontinued. After standing overnight, the charge remained compatible.

Next 4 grams of anhydrous sodium carbonate was added to the pot and the polymer stirred for 30 minutes at room temperature. The benzene was then distilled off under water aspirator vacuum and the charge filtered to remove excess sodium carbonate. The product was a clear amber color having a viscosity slightly less than the LP-2 polymer used as a starting material. An analysis of the product showed:

|  | Percent |
|---|---|
| Sulfur content | 21.70 |
| Hydroxyl content | 2.18 |
| Mercaptan content | 0 |

EXAMPLE 2

A flask of suitable size was charged with 2 mols (268 grams) of dipropylene glycol, 2.20 mols (66 grams) of p-formaldehyde, 1 cc. of concentrated sulfuric acid and 100 cc. of benzene. The charge was heated with agitation to reflux temperature and refluxed until no more water came off through the moisture trap. A total of 33 cc. of water was removed in this way to form a polyformal of the dipropylene glycol which was then cooled to room temperature.

Thereafter 332 grams (equal to 2 mol segment weights) of LP-2 polymer was added to the pot and the mixture, which was an opaque white color, was slowly heated to a pot temperature of approximately 50° C. At this point the opaqueness disappeared, so heating was discontinued. Next 4 grams of anhydrous sodium carbonate was added to the pot and the charge stirred for 30 minutes at room temperature under $N_2$. Then it was rigged for distillation and the benzene distilled off under water aspirator vacuum. After filtering through a Buchner funnel to remove the soda ash, the charge was bottled. An analysis of this product showed:

|  | Percent |
|---|---|
| Hydroxyl content | 2.88 |
| Mercaptan content | 0 |
| Sulfur content | 19.42 |
| Active acidity content | 0.01 |

The finished polymer was a clean light-yellow liquid with a viscosity similar to that of LP-3 polysulfide polymer.

Next a prepolymer was prepared from this material by reacting it with toluene diisocyanate, using a ratio of 2 mols of NCO/mol of OH. A film prepared from this prepolymer cured tack-free after 2 days' exposure to the atmosphere at room temperature. A sample of the prepolymer reacted with methyl bis-orthochloroaniline (ratio: 1.05 mols NCO/0.50 and MOCA) cured to a tough solid in 30 minutes at 100° C. After 16 hours at this temperature, the sample was even tougher.

Another sample of the NCO-terminated prepolymer was reacted with the polyol produced as described above by the coreaction of LP-2 polymer with the polyformal of dipropylene glycol, using a ratio of 1 mol of NCO/ mol of OH. After 2 hours at 100° C., the sample had gelled, and in another hour it cured to a rubbery solid.

EXAMPLE 3

A reaction flask was charged with 2 mols (385 grams) of tripropylene glycol, 2.20 mols (66 grams) of p-formaldehyde, 1 cc. of concentrated sulfuric acid and 100 cc. of benzene. The charge was reacted at reflux until no more water had distilled over. 41 cc. of water was removed, after which the polyformal was cooled to room temperature.

Thereafter 332 grams of LP-2 polymer was added and the mixture slowly heated with agitation, under $N_2$, until compatible. At approximately 84° C. compatibility was achieved so heating was discontinued. From this point on the reaction mixture was worked up in the same manner as in Example 2. The finished product was a liquid with low viscosity quite like the one described in Example 2. An analysis of this material indicated it contained no mercaptan, 16.58% sulfur, 2.88% hydroxyl and 0.002% active acidity.

EXAMPLE 4

A reaction flask was charged initially with 2 mols (289 grams) of tetraethylene glycol, 2.20 mols (66 grams) of p-formaldehyde, 1 cc. of concentrated $H_2SO_4$ and 100 cc.

of benzene. Then the charge was heated to reflux to remove the water of reaction. After approximately 2 hours of refluxing, only 5 cc. of water had distilled over so 1 cc. more of concentrated acid and another 100 cc. of benzene was added. Refluxing was then continued until a total of 44 cc. of water had been removed.

Next the mixture in the flask was cooled to room temperature and 332 grams of LP-2 polymer was added to the charge. Then the mixture was heated with agitation under $N_2$ until compatible. At 45° C. compatibility was achieved, but heating was continued at 70° C. for 1 hour. At the end of this period, the charge was cooled down to room temperature and 8 grams of sodium carbonate was added. The benzene was removed by distillation and the product filtered to remove excess soda ash. The resulting product was similar to that of Example 2.

EXAMPLE 5

A flask of suitable size was charged with 4 mols (424 grams) of diethylene glycol, 2 mols (292 grams) adipic acid, 1 cc. of concentrated sulfuric acid and 200 cc. of reagent benzene. The charge was then heated with agitation to reflux temperature. At reflux temperature water began to form in the moisture trap. Refluxing was continued until water ceased to distill off. A total of 74 cc. of water was removed in this manner. Next the charge was cooled down to room temperature and 2.28 mols (72 grams) of p-formaldehyde (95% powder) was added to the pot. The charge was again heated to reflux and 43 cc. more water was removed from the reaction, after which the charge in the pot was cooled to room temperature.

Thereafter 332 grams (2 polymer segment weights) of LP-2 polymer was added. The charge at this stage was an opaque white color. The reaction mixture was then slowly heated under nitrogen until a pot temperature of 60° C. was reached. At this temperature the charge was compatible (a clear amber color) but the pot temperature was raised to 70° C. and held there for one hour to be sure reaction was complete. Then after cooling down, 4 grams of anhydrous sodium carbonate was added to the pot and the charge stirred for 30 minutes at room temperature.

Next the benzene was distilled off under water aspirator vacuum and the product filtered through a Buchner funnel under vacuum to remove the sodium carbonate. An analysis of this product follows:

| | Percent |
|---|---|
| Hydroxyl content | 1.09 |
| Mercaptan content | 0 |
| Sulfur content | 12.13 |
| Water content | 0.29 |
| Active acidity content | 0.0026 |

Since there appeared to be some water present, the product was dried to constant weight before preparation of a prepolymer. A prepolymer prepared by reacting this material with toluene diisocyanate at an NCO:OH ratio of 1:1 yielded a clear, but relatively viscous product.

EXAMPLE 6

A flask was charged with 6 mols (900 grams) of triethylene glycol, 6.62 mols (198 grams) of 95% p-formaldehyde powder (10% excess), 3 cc. of concentrated $H_2SO_4$ and 300 cc. of reagent benzene. This charge was heated with agitation to reflux. Refluxing was continued until no more water came over in the moisture trap. Approximately 131 cc. of water was removed in this way.

Next the charge was cooled down to room temperature and 996 grams (equivalent to 6 polymer weight segments) of LP-2 polymer was added to the pot. The charge, which was now opaque in appearance, was slowly heated to 70° C. At this temperature it became clear and heating was continued for one hour. After analytic data had been obtained on this material, a prepolymer was prepared by reaction with toluene diisocyanate at an NCO/OH ratio of 2:1. A sample of the prepolymer was cured with methyl bis-orthochloroaniline using an NCO/MOCA ratio of 1.05:0.50. It cured in approximately 30 minutes at 100° C. to a solid with a Shore D Durometer reading of 80.

Another sample was cured by the chain extension method, i.e., by reacting the prepolymer with the interchange reaction product, using a ratio of 1.02 mols of NCO per 1 mol of OH. This sample cured to a solid gum-like consistency in 5 hours at 100° C.

Samples of the uncured prepolymers prepared as described above, when stored for a month in the absence of air, showed little increase in viscosity.

EXAMPLE 7

A reaction flask was charged with 6 mols (625 grams) of neopentyl glycol, 6.62 mols (198 grams) 95% p-formaldehyde (10% excess), 600 cc. of reagent benzene and 1.50 cc. of concentrated $H_2SO_4$. The charge was heated at reflux until approximately 6 mols of water had been removed and then cooled to room temperature.

605 grams of this product (approximately half the charge) was distilled to remove the benzene and then reacted with 498 grams of LP-2 polymer (equal to 3 polymer weight segments) without previously neutralizing the $H_2SO_4$ catalyst. The charge became homogeneous as soon as the LP polymer was added, but it was reacted for 1 hour at 70° C. to be sure the reaction was complete. The reaction product was reacted with diisocyanate to prepare a prepolymer, and cured as described in the preceding examples.

EXAMPLE 8

A linear polyester was prepared by condensing a mixture of 80 mol percent of ethylene glycol and 20 mol percent of propylene glycol with adipic acid to produce a polymer having a molecular weight of 2500. A reactor was charged with 500 grams of the polyester as thus prepared, 500 grams of LP-2 polysulfide polymers, 500 cc. of benzene and 0.2 cc. of concentrated sulfuric acid. The mixture after stirring was opaque, thus indicating that the reactants were not compatible. After stirring at 70° C. for three hours and cooling to room temperature, the mixture was still opaque. An additional 0.2 cc. of concentrated sulfuric acid was added and the mixture stirred at 70° C. for an additional three hours. On cooling the contents of the reactor were clear and transparent.

The product as thus prepared was analyzed with the following results:

| | Percent |
|---|---|
| Mercaptan content | 0.01 |
| Sulfur content | 16.79 |
| Hydroxyl content | 0.80 |
| Water content | 0.05 |
| Active acidity content | 0.003 |

A prepolymer of this product was prepared as follows: A flask was charged with 500 grams of the polyester polysulfide polymer and 40.8 grams of tolylene diisocyanate (a ratio of 2 mols of NCO to 1 mol of polymer OH). The mixture was heated with agitation at 110° C. for 3 hours under a nitrogen atmosphere to form an isocyanate-terminated prepolymer.

The prepolymer as thus prepared was cured with methyl bis-orthochloroaniline using a ratio of one mol of prepolymer NCO to 0.50 mol of the curing agent. Curing was effected at a temperature of 100° C. and at the end of one hour the prepolymer had cured to a flexible solid.

EXAMPLE 9

A trace of sulfuric acid was added to a mercapto-terminated ethylene formal type of liquid polysulfide polymer having a molecular weight of 3000 and an SH content of 1.6% and the mixture heated for a few minutes. This heating of the mercapto-terminated polymer caused an inversion reaction to take place whereby the SH terminals were replaced by OH terminals to give a hydroxyl-terminated polysulfide polymer also having a molecular weight of about 3000. Analysis of the product showed no SH groups but about 1.2% of OH groups present.

A reactor was charged with 250 grams of the hydroxyl-terminated polysulfide polymer as thus prepared, 250 grams of a polyester prepared from adipic acid and an 80/20 mixture of ethylene and propylene glycols and having a molecular weight of 2500, 250 cc. of benzene and 0.2 cc. of concentrated sulfuric acid. Upon stirring the mixture was opaque white in appearance, thus indicating that the reactants were not compatible. It was heated to 70° C. and after a few minutes it became clear and transparent. The mixture was then heated at 70° C. for three hours and then cooled to room temperature. It remained clear and permanently transparent. Analysis of the product showed that it contained 1.5% of OH groups.

From the foregoing description and examples it should be apparent that the present invention provides an exceptionally simple and effective method of preparing hydroxyl-terminated polysulfide polymers having a wide variety of hydrocarbon and oxahydrocarbon chain units between the polysulfide groups thereof. Moreover, a random distribution of different structures linking the polysulfide groups can be readily achieved. It is of course to be understood that the foregoing description is intended to be illustrative only and that numerous changes can be made in the reactants, proportions and conditions disclosed without departing from the spirit of the invention as set forth in the appended claims.

I claim:
1. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl or mercapto terminals and a linear backbone consisting essentially of spaced polysulfide groups and repeating identical oxahydrocarbon groups having the structure —ROCH$_2$OR—, wherein R is lower alkylene, between the polysulfide groups thereof with (2) a hydroxyl-terminated polymer having a molecular weight of 500 to 10,000 and selected from linear polyesters, polyformals of polyalkylene glycols, polyformals of linear polyesters and mixtures thereof and (3) a catalytic amount of a strong non-oxidizing acid, (B) maintaining said mixture at a temperature of 20° C. to 70° C. to cause an interchange reaction to occur to produce said liquid polymeric product and (C) recovering said polymeric product from the reaction mixture.

2. A liquid polymeric product made by the process of claim 1.

3. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl terminals and a linear backbone consisting essentially of spaced polysulfide groups and repeating identical oxahydrocarbon groups having the structure —ROCH$_2$OR—, wherein R is lower alkylene, between the polysulfide groups thereof with (2) a hydroxyl-terminated polymer having a molecular weight of 500 to 10,000 and selected from linear polyesters, polyformals of polyalkylene glycols, polyformals of linear polyesters and mixtures thereof and (3) a catalytic amount of a strong non-oxidizing acid, (B) maintaining said mixture at a temperature of 20° C. to 70° C. to cause an interchange reaction to occur to produce said liquid polymeric product and (C) recovering said polymeric product from the reaction mixture.

4. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having mercapto terminals and a linear backbone consisting essentially of spaced polysulfide groups and repeating identical oxahydrocarbon groups having the structure —ROCH$_2$OR—, wherein R is lower alkylene, between the polysulfide groups thereof with (2) a hydroxyl-terminated polymer having a molecular weight of 500 to 10,000 and selected from linear polyesters, polyformals of polyalkylene glycols, polyformals of linear polyesters and mixtures thereof and (3) a catalytic amount of a strong nonoxidizing acid, (B) maintaining said mixture at a temperature of 20° C. to 70° C. to cause an interchange reaction to occur to produce said liquid polymeric product and (C) recovering said polymeric product from the reaction mixture.

5. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having mercapto terminals and a linear backbone consisting essentially of spaced polysulfide groups and repeating identical oxahydrocarbon groups having the structure —ROCH$_2$OR—, wherein R is lower alkylene, between the polysulfide groups thereof with (2) a a hydroxyl-terminated linear polyester having a molecular weight of 500 to 10,000 and (3) a catalytic amount of a strong non-oxidizing acid, (B) maintaining said mixture at a temperature of 20° C. to 90° C. to cause an interchange reaction to occur to produce said liquid polymeric product and (C) recovering said polymeric product from the reaction mixture.

6. A method according to claim 5 wherein said linear polyester is a condensation product of adipic acid and a mixture of 80 mol percent ethylene glycol and 20 mol percent propylene glycol.

7. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having mercapto terminals and a linear backbone consisting essentially of spaced polysulfide groups and repeating identical oxahydrocarbon groups having the structure —ROCH$_2$OR—, wherein R is lower alkylene, between the polysulfide groups thereof with (2) a polyformal of polyalkylene glycol having a molecular weight of 500 to 10,000 and (3) a catalytic amount of a strong non-oxidizing acid, (B) maintaining said mixture at a temperature of 20° C. to 90° C. to cause an interchange reaction to occur to produce said liquid polymeric product and (C) recovering said polymeric product from the reaction mixture.

8. A method according to claim 7 wherein said glycol is diethylene glycol.

9. A method according to claim 7 wherein said glycol is triethylene glycol.

10. A method according to claim 7 wherein said glycol is tetraethylene glycol.

11. A method according to claim 7 wherein said glycol is dipropylene glycol.

12. A method according to claim 7 wherein said glycol is tripropylene glycol.

13. A method according to claim 7 wherein said glycol is neopentyl glycol.

14. A liquid polymeric product made by the process of claim 7.

15. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having mercapto terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polyformal of linear polyester having a molecular weight of 500 to 10,000 and (3) a catalytic amount of a strong non-oxidizing acid, (B) maintaining said mixture at a temperature of 20° C. to 90° C. to cause an interchange reaction to occur to produce said liquid polymeric product and (C) recovering said polymeric product from the reaction mixture.

16. A method according to claim 15 wherein said polyester is a condensation product of diethylene glycol and adipic acid.

17. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl or mercapto terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polymer having a molecular weight of 500 to 10,000 and selected from linear polyesters, polyformals of polyalkylene glycols, polyformals of linear polyesters and mixtures thereof and (3) a catalytic amount of a strong non-oxidizing acid, (B) maintaining said mixture at a temperature of 20° C. to 90° C. to cause an interchange reaction to occur to produce said liquid polymeric product and (C) recovering said polymeric product from the reaction mixture.

18. A method according to claim 17 wherein said acid is sulfuric acid.

19. A liquid polymeric product made by the process of claim 17.

20. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl or mercapto terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polymer having a molecular weight of 500 to 10,000 and selected from linear polyesters, polyformals of linear polyesters and mixtures thereof and (3) a catalytic amount of a strong non-oxidizing acid, (B) maintaining said mixture at a temperature of 20° C. to 70° C. to cause an interchange reaction to occur to produce said liquid polymeric product and (C) recovering said polymeric product from the reaction mixture.

21. A liquid polymeric product made by the process of claim 20.

22. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polymer having a molecular weight of 500 to 10,000 and selected from linear polyesters, polyformals of linear polyesters and mixtures thereof and (3) a catalytic amount of a strong non-oxidizing acid, (B) maintaining said mixture at a temperature of 20° C. to 70° C. to cause an interchange reaction to occur to produce said liquid polymeric product and (C) recovering said polymeric product from the reaction mixture.

23. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having mercapto terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polymer having a molecular weight of 500 to 10,000 and selected from linear polyesters, polyformals of linear polyesters and mixtures thereof and (3) a catalytic amount of a strong non-oxidizing acid, (B) maintaining said mixture at a temperature of 20° to 70° C. to cause an interchange reaction to occur to produce said liquid polymeric product and (C) recovering said polymeric product from the reaction mixture.

24. A method of making a liquid polymeric product comprising a mixture of hydroxyl-terminated polysulfide polymers having a random distribution of diverse oxahydrocarbon groups between the polysulfide groups thereof, said method comprising (A) mixing (1) a liquid polysulfide polymer having a molecular weight of 500 to 10,000 and having hydroxyl or mercapto terminals and a linear backbone consisting essentially of spaced polysulfide groups and repeating identical oxahydrocarbon groups having the structure —$ROCH_2OR$—, wherein R is lower alkylene, between the polysulfide groups thereof with (2) a hydroxyl-terminated polymer having a molecular weight of 500 to 10,000 and selected from linear polyesters, polyformals of linear polyesters and mixtures thereof and (3) a catalytic amount of a strong non-oxidizing acid, (B) maintaining said mixture at a temperature of 20° C. to 90° C. to cause an interchange reaction to occur to produce said liquid polymeric product and (C) recovering said polymeric product from the reaction mixture.

25. A method according to claim 24 wherein said acid is sulfuric acid.

References Cited

FOREIGN PATENTS 649,149   9/1962   Canada.

MELVIN GOLDSTEIN, Primary Examiner

U.S. Cl. X.R.

260—67 S, 75 S, 77.5 AP, 823, 860